April 9, 1963  M. VUYNOVICH  3,084,444
INTERPOLATOR
Filed Feb. 9, 1960  2 Sheets-Sheet 1
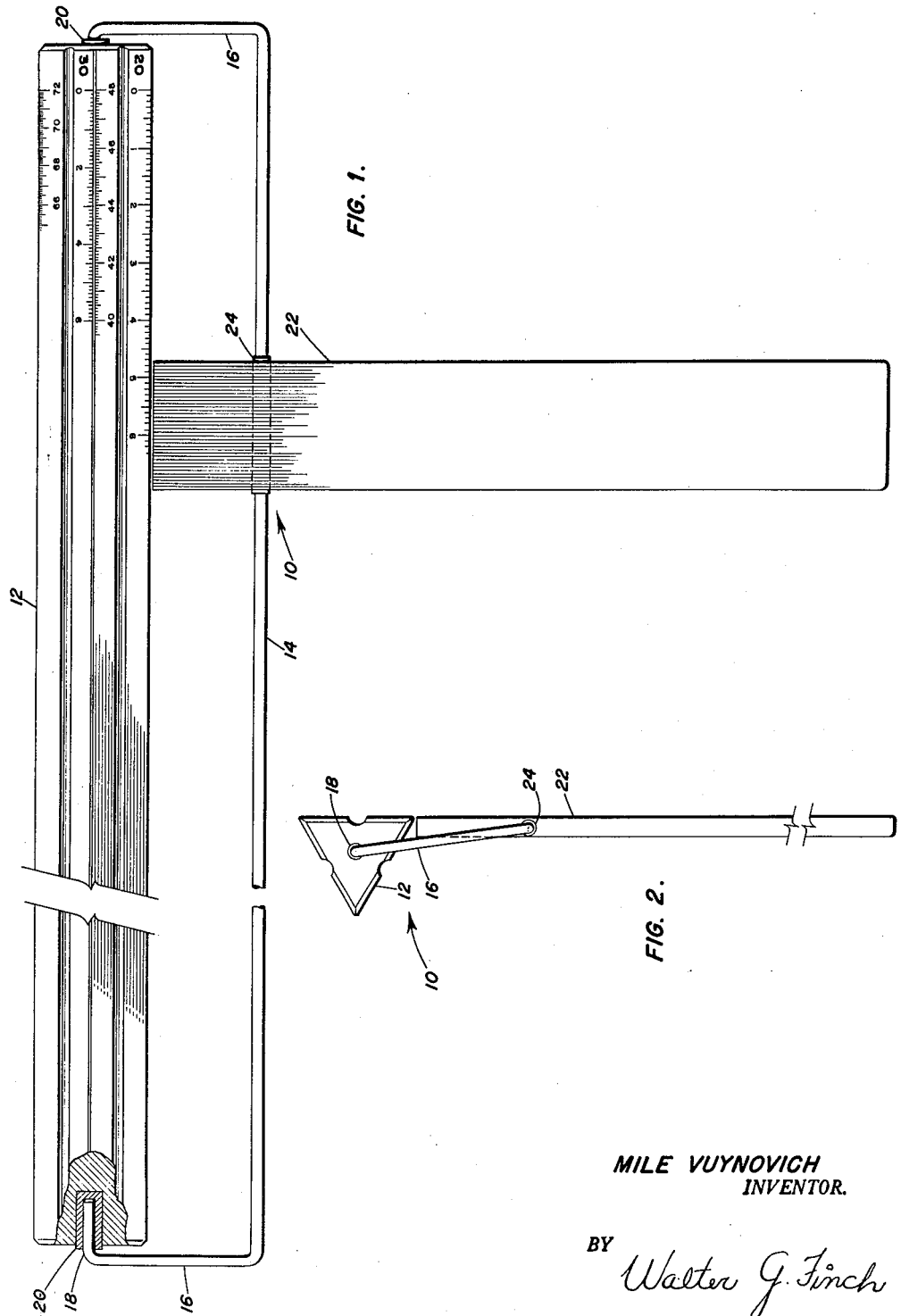
MILE VUYNOVICH
    INVENTOR.
BY Walter G. Finch
    ATTORNEY April 9, 1963

M. VUYNOVICH 3,084,444

INTERPOLATOR

Filed Feb. 9, 1960

MILE VUYNOVICH
INVENTOR.

BY Walter G. Finch
ATTORNEY 3,084,444
INTERPOLATOR
Mile Vuynovich, 2906 Southern Ave., Baltimore 14, Md.
Filed Feb. 9, 1960, Ser. No. 7,696
3 Claims. (Cl. 33—102)

This invention relates generally to measuring instruments, and, more particularly, it pertains to an interpolator device for determining points intermediate of two known locations on a map or drawing.

The application of the principle of similar triangles to the problem of interpolation is well-known to cartographers and draftsmen. However, the manipulation of three items, namely, a scale, a triangle, and a pencil, with only two hands to locate a third point between two other points is awkward and subject to slippage and error.

It is, therefore, an object of this invention to provide a unitary interpolator which can easily be oriented to span two points and locate a point therebetween.

Another point of this invention is to provide a multi-scale indexing, perpendicular pencil guide rule.

Still another object of the invention is to provide a simple, effective, captivated rule rider attachment for conventional draftsman's scales.

Other objects of this invention are to provide an interpolator device which is extremely economical to manufacture, efficient and reliable in operational use, and in which the various parts can be easily replaced for maintenance, and which can be easily disassembled for storage or assembled for operational use.

These and other objects and attendant advantages will become more readily apparent and understood from the accompanying specification and drawings in which:

FIG. 1 is a plan view, partly broken away, of an interpolator device incorporating features of this invention;

FIG. 2 is a side view of the interpolator device shown in FIG. 1;

Figure 4:
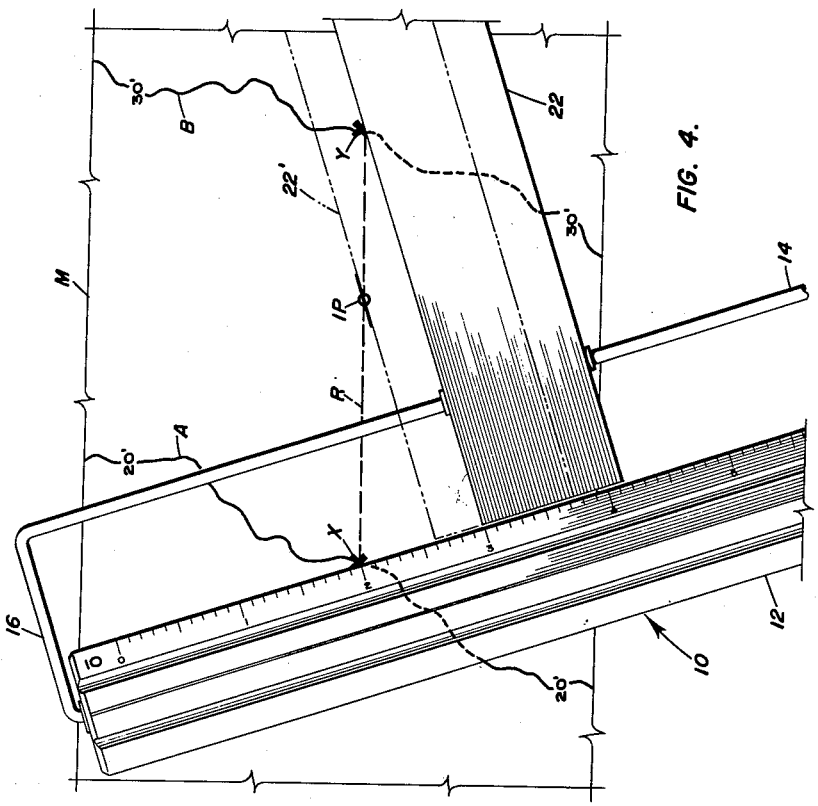
FIG. 4 is a schematic depicting the application of the interpolator device to the solution of the problem illustrated in FIG. 3.

Referring now to the details of the drawings, there is shown generally in FIGS. 1 and 2 an interpolating device 10. The interpolating device 10 consists of a conventional triangular engineer's scale 12 to which is pivotally mounted a stiff stirrup-shaped wire bail 14. Although this invention is illustrated in conjunction with an engineer's scale 12, other types of scales or rulers of different shapes can be used and the invention, therefore, is not limited to use with an engineer's scale 12. The bail 14 is provided with equal length side legs 16 which have short turned-in ends 18.

The engineer's scale 12 is bored at both ends to receive coaxially mounted bushings 20 into which the ends 18 of the bail extend. The bail 14 is provided with a slide bar 22 which has a bushing 24. This slide bar 22 is preferably made of transparent plastic. This arrangement allows the bar 22 to traverse the length of the bail 14 with its end in close proximity to the rulings of scale 12 but spaced therefrom.

Figure 3:
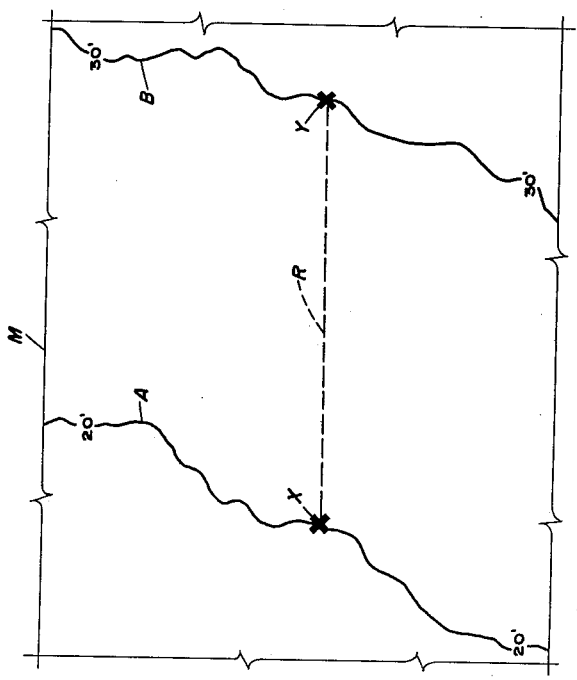
FIG. 3 is a schematic of a portion of a chart illustrating a typical contour interpolation problem.

The chart or map illustrated in FIG. 3 contains a typical problem of interpolation. Reference letters A and B represent, for example, twenty-foot (20') and thirty-foot (30') contour lines. Let it be assumed that it is desired to locate a point twenty-six feet (26') in elevation intermediate the two points X and Y on the contour lines A and B, respectively.

There is first drawn a light auxiliary line R between the two points X and Y. Then an appropriate scale, such as the tenth scale, that is, ten increments per inch, on the engineer's scale 12 of the interpolation device 10 is selected so that the lower elevation matches one point on the scale 12. The slide bar 22 is slid along the bail 14, with the end thereof adjacent the tenth scale on the engineer's scale 12 so that the edge of the slide bar 22 reads the value of the higher point.

Next the interpolation device 10 is rotated on the map M, as shown in FIG. 4, so as to match the scale value of the low elevation point X with the point Y and so that the edge of the slide bar 22 passes through the point of higher elevation. If difficulty is encountered, a different scale should be chosen.

With the engineer's scale 12 held firmly with one hand in the position recited, the slide bar 22 may be positioned with the other hand to any scale value between the two plotted points X and Y. The intersection of the slide bar 22 with the auxiliary line R is the point having the desired value set on the scale of the engineer's scale 12, such as a point of twenty-six feet (26') elevation, which was the point to be located in the problem.

In the illustrated problem, this involves moving the slide bar 22 to the dot-dashed position 22' of the slide bar 22, which corresponds to a scale reading of 2.6 of twenty-six feet (26'), as desired. The interpolation point IP obtained by the interpolator device 10 can now be marked at the intersection of the position 22' of the slide bar 22 and the auxiliary line R.

It is to be pointed out that the interpolating device 10 although illustrated in connection with determining certain points between known contour lines, as explained above, can also be utilized more often to determine certain points between known points. After such interpolation is done between more points, the new contours are pulled. In cartography, pulling of the new contours is done more often while interpolating between given contours is seldom required, although the invention was illustrated in connection with the latter for simplicity and it can be readily used with the former without change of the interpolating device 10.

Obviously many modifications and variations of the present invention are possible in light of the above teachings. It is, therefore, to be understood that within the scope of the appended claims the invention may be practiced otherwise than as specifically described.

What is claimed is:

1. An interpolator device, comprising, a three-faced, six-scale, triangular engineer's scale, means including an arm mounted to at least one end of said scale, for rotational movement about the longitudinal axis of said scale, means including a slide bar mounted to said arm and arranged for rotational movement about said arm as well as rotational movement with said arm about the longitudinal axis of said scale and for sliding movement in the longitudinal direction along the length of said arm, said slide bar having at least one edge always positioned angularly to said scale so that markings can be laid out therealong corresponding to the spaced scale markings along said scale.

2. An interpolator device, comprising, a three-faced, six-scale, triangular engineer's scale, means including an arm mounted to at least one end of said structure and having a portion thereof arranged substantially parallel to said scale for rotational movement about the longitudinal axis of said scale, and means including a slidable member having at least one straight edge, said member being mounted to said arm and arranged for rotational movement about said arm as well as rotational movement with said arm about the longitudinal axis of said scale and for sliding movement in the longitudinal direction along said arm, said slidable member having said one edge always positioned angularly to said scale, so that markings can be laid out corresponding to the spaced scale markings along said scale.

3. An interpolator device, comprising, a three-faced, six-scale, triangular engineer's scale, a bail mounted to opposite ends of said scale and having an intermediate portion arranged parallel to the longitudinal axis of said scale and arranged for rotational movement about said longitudinal axis of said scale, and means including a slide bar mounted to said bail and arranged for rotational movement about said bail as well as rotational movement with said bail about said longitudinal axis of said scale and for sliding movement in either direction along said bail, said slide bar having spaced parallel edges positioned substantially perpendicularly to said scale, with one end of said slide bar being positioned parallel to but spaced from said scale so that markings can be laid out along said edges of said slide bar corresponding to said spaced scale markings along said scale.

References Cited in the file of this patent

UNITED STATES PATENTS

| | | |
|---|---|---|
| 1,175,448 | Hess | Mar. 14, 1916 |
| 1,422,641 | Walters | July 11, 1922 |
| 2,048,221 | Redding | July 21, 1936 |
| 2,301,068 | Morgan | Nov. 3, 1942 |
| 2,394,983 | Clarkson | Feb. 19, 1946 |

FOREIGN PATENTS

| | | |
|---|---|---|
| 824,316 | Germany | Dec. 10, 1951 |
| 289,408 | Switzerland | July 1, 1953 |
| 1,098,126 | France | Mar. 2, 1955 |